United States Patent
Allen et al.

(10) Patent No.: US 10,524,087 B1
(45) Date of Patent: Dec. 31, 2019

(54) MESSAGE DESTINATION LIST MECHANISM

(71) Applicant: Snap Inc., Venice, CA (US)

(72) Inventors: Nicholas Richard Allen, Venice, CA (US); Robert Cornelius Murphy, Venice, CA (US); Evan Spiegel, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/946,990

(22) Filed: Apr. 6, 2018

Related U.S. Application Data

(63) Continuation of application No. 15/298,806, filed on Oct. 20, 2016, which is a continuation of application No. 14/738,069, filed on Jun. 12, 2015, now Pat. No. 9,532,171, which is a continuation of application No. 14/304,855, filed on Jun. 13, 2014, now Pat. No. 9,113,301.

(51) Int. Cl.
*H04W 4/021* (2018.01)
*H04W 4/029* (2018.01)
*G06Q 50/00* (2012.01)

(52) U.S. Cl.
CPC ............ *H04W 4/021* (2013.01); *G06Q 50/01* (2013.01); *H04W 4/029* (2018.02)

(58) Field of Classification Search
CPC ....... H04W 4/021; H04W 4/029; G06Q 50/01
See application file for complete search history.

(56) References Cited

U.S. PATENT DOCUMENTS

| | | |
|---|---|---|
| 666,223 A | 10/1901 | Shedlock |
| 4,581,634 A | 4/1986 | Williams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |

(Continued)

FOREIGN PATENT DOCUMENTS

| | | |
|---|---|---|
| CA | 2887596 A1 | 7/2015 |
| CA | 2894332 | 8/2018 |

(Continued)

OTHER PUBLICATIONS

US 10,075,404 B1, 09/2018, Allen et al. (withdrawn)

(Continued)

*Primary Examiner* — Mazda Sabouri
(74) *Attorney, Agent, or Firm* — Schwegman Lundberg & Woessner, P.A.

(57) ABSTRACT

In response to generation of a message in a communication application on a client device, a graphical user interface is generated on the client device. The graphical user interface includes a destination list that includes user-selectable entries for individual recipients and for a gallery of ephemeral message. The user can send the message to individual recipients and/or add the message to the gallery by selecting the corresponding entries.

20 Claims, 5 Drawing Sheets

(56) References Cited

U.S. PATENT DOCUMENTS

| | | |
|---|---|---|
| 6,029,141 A | 2/2000 | Bezos et al. |
| 6,038,295 A | 3/2000 | Mattes |
| 6,049,711 A | 4/2000 | Yehezkel et al. |
| 6,075,535 A | 6/2000 | Fitzhugh et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,290,504 B1 | 9/2001 | Benitz et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,499,016 B1 | 12/2002 | Anderson |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,004,394 B2 | 2/2006 | Kim |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,142,823 B1 | 11/2006 | Logue et al. |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,856,449 B1 | 12/2010 | Martino et al. |
| 7,912,896 B2 | 3/2011 | Wolovitz et al. |
| 7,934,156 B2 | 4/2011 | Forstall et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,369,866 B2 | 2/2013 | Ashley, Jr. et al. |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,471,914 B2 | 6/2013 | Sakiyama et al. |
| 8,472,935 B1 | 6/2013 | Fujisaki |
| 8,494,481 B1 | 7/2013 | Bacco et al. |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |

(56) References Cited

U.S. PATENT DOCUMENTS

| | | |
|---|---|---|
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,686,962 B2 | 4/2014 | Christie |
| 8,687,021 B2 | 4/2014 | Bathiche et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 | 7/2014 | Putz et al. |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Roote et al. |
| 8,909,714 B2 | 12/2014 | Agarwal et al. |
| 8,909,725 B1 | 12/2014 | Sehn |
| 8,914,752 B1 | 12/2014 | Spiegel |
| 8,925,106 B1 | 12/2014 | Steiner et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,055,416 B2 | 6/2015 | Rosen et al. |
| 9,063,638 B1 | 6/2015 | Schrock et al. |
| 9,083,770 B1 | 7/2015 | Drose et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B2 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,319,472 B2 | 4/2016 | Cathcart et al. |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 | 8/2016 | Smith |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,477,391 B2 | 10/2016 | Flynn, III et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,542,422 B2 | 1/2017 | Duggal et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,672,538 B1 | 6/2017 | Vaynblat et al. |
| 9,674,660 B1 | 6/2017 | Vaynblat et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,802,121 B2 | 10/2017 | Ackley et al. |
| 9,825,898 B2 | 11/2017 | Sehn |
| 9,843,720 B1 | 12/2017 | Ebsen et al. |
| 9,854,219 B2 | 12/2017 | Sehn |
| 9,866,999 B1 | 1/2018 | Noeth |
| 9,881,094 B2 | 1/2018 | Pavlovskaia |
| 9,961,520 B2 | 5/2018 | Brooks et al. |
| 10,133,705 B1 | 11/2018 | Allen et al. |
| 10,182,311 B2 | 1/2019 | Sehn |
| 10,200,813 B1 | 2/2019 | Allen et al. |
| 10,284,508 B1 | 5/2019 | Allen et al. |
| 10,311,916 B2 | 6/2019 | Sehn |
| 10,416,845 B1 | 9/2019 | Allen et al. |
| 10,448,201 B1 | 10/2019 | Sehn et al. |
| 10,476,830 B2 | 11/2019 | Allen et al. |
| 2001/0025316 A1 | 9/2001 | Oh |
| 2001/0028787 A1 | 10/2001 | Nomura et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0098850 A1 | 7/2002 | Akhteruzzaman et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0171669 A1 | 11/2002 | Meron et al. |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell et al. |
| 2003/0148773 A1 | 8/2003 | Spriestersbach et al. |
| 2003/0163370 A1 | 8/2003 | Chen et al. |
| 2003/0164856 A1 | 9/2003 | Prager et al. |
| 2003/0217106 A1 | 11/2003 | Adar |
| 2003/0217118 A1 | 11/2003 | Kobayashi et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0185877 A1 | 9/2004 | Asthana et al. |
| 2004/0189465 A1 | 9/2004 | Capobianco et al. |
| 2004/0199402 A1 | 10/2004 | Walker et al. |
| 2004/0203959 A1 | 10/2004 | Coombes |
| 2004/0205480 A1 | 10/2004 | Moore |
| 2004/0205514 A1 | 10/2004 | Sommerer et al. |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0071435 A1 | 3/2005 | Karstens |
| 2005/0078804 A1 | 4/2005 | Yomoda |
| 2005/0097176 A1 | 5/2005 | Schatz et al. |

(56) References Cited

U.S. PATENT DOCUMENTS

| | | |
|---|---|---|
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0004630 A1 | 1/2006 | Criddle et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0127054 A1 | 6/2006 | Matsuyama |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0003221 A1 | 1/2007 | Hamada et al. |
| 2007/0004426 A1 | 1/2007 | Pfleging et al. |
| 2007/0028183 A1 | 2/2007 | Ostojic et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0092668 A1 | 4/2007 | Hood |
| 2007/0106706 A1 | 5/2007 | Ahrens et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0268988 A1 | 11/2007 | Hedayat et al. |
| 2007/0281690 A1 | 12/2007 | Altman et al. |
| 2007/0299807 A1 | 12/2007 | Lea et al. |
| 2008/0012987 A1 | 1/2008 | Hirata et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0046476 A1 | 2/2008 | Anderson |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222158 A1 | 9/2008 | Saika |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0263103 A1 | 10/2008 | Mcgregor et al. |
| 2008/0266421 A1 | 10/2008 | Takahata et al. |
| 2008/0270938 A1 | 10/2008 | Carlson |
| 2008/0284587 A1 | 11/2008 | Saigh et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0316181 A1 | 12/2008 | Nurmi |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0169062 A1 | 7/2009 | Cheung et al. |
| 2009/0177299 A1 | 7/2009 | Van De Sluis |
| 2009/0177588 A1 | 7/2009 | Marchese |
| 2009/0177730 A1 | 7/2009 | Annamalai et al. |
| 2009/0187825 A1 | 7/2009 | Sandquist et al. |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0235155 A1 | 9/2009 | Ueda |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284658 A1 | 11/2009 | Cho |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0001980 A1 | 1/2010 | Kim et al. |
| 2010/0011316 A1 | 1/2010 | Sar et al. |
| 2010/0039505 A1 | 2/2010 | Inoue et al. |
| 2010/0041378 A1 | 2/2010 | Aceves et al. |
| 2010/0062794 A1 | 3/2010 | Han |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0100729 A1 | 4/2010 | Read et al. |
| 2010/0113065 A1 | 5/2010 | Narayan et al. |
| 2010/0115281 A1 | 5/2010 | Camenisch et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161658 A1 | 6/2010 | Hamynen et al. |
| 2010/0161831 A1 | 6/2010 | Haas et al. |

(56) References Cited

U.S. PATENT DOCUMENTS

| | | |
|---|---|---|
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0185987 A1 | 7/2010 | Yang et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0199227 A1 | 8/2010 | Xiao et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0251143 A1 | 9/2010 | Thomas et al. |
| 2010/0257196 A1 | 10/2010 | Waters et al. |
| 2010/0259386 A1 | 10/2010 | Holley et al. |
| 2010/0273463 A1 | 10/2010 | Bonnefoy |
| 2010/0273509 A1 | 10/2010 | Sweeney et al. |
| 2010/0281045 A1 | 11/2010 | Dean |
| 2010/0293105 A1 | 11/2010 | Blinn et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0085059 A1 | 4/2011 | Noh |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0131633 A1 | 6/2011 | Macaskill et al. |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0294541 A1 | 12/2011 | Zheng et al. |
| 2011/0306387 A1 | 12/2011 | Moon |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0054811 A1 | 3/2012 | Spears |
| 2012/0059722 A1 | 3/2012 | Rao |
| 2012/0062805 A1 | 3/2012 | Candelore |
| 2012/0084731 A1* | 4/2012 | Filman .................... G06F 16/51 715/838 |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1 | 5/2012 | Koskimies |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0127196 A1 | 5/2012 | Landry |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0163664 A1 | 6/2012 | Zhu |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0201362 A1 | 8/2012 | Crossan et al. |
| 2012/0208564 A1 | 8/2012 | Clark et al. |
| 2012/0209892 A1* | 8/2012 | MacAskill ........ G06F 17/30244 707/812 |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0311623 A1 | 12/2012 | Davis et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0008238 A1 | 1/2013 | Bigatti et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057489 A1 | 3/2013 | Morton |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0076758 A1 | 3/2013 | Li et al. |
| 2013/0080254 A1 | 3/2013 | Thramann |

(56) References Cited

U.S. PATENT DOCUMENTS

| | | |
|---|---|---|
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0115872 A1 | 5/2013 | Huang et al. |
| 2013/0122862 A1 | 5/2013 | Horn et al. |
| 2013/0122929 A1 | 5/2013 | Al-mufti et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1* | 9/2013 | Knapp .............. H04L 67/22 709/203 |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0283167 A1 | 10/2013 | Xu |
| 2013/0290337 A1 | 10/2013 | Lansford et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0028589 A1 | 1/2014 | Reilly |
| 2014/0029034 A1 | 1/2014 | Toriyama |
| 2014/0031899 A1 | 1/2014 | Fridman |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1* | 2/2014 | Shidfar ............ G06Q 10/06311 705/7.13 |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0082651 A1 | 3/2014 | Sharifi |
| 2014/0089264 A1 | 3/2014 | Talagala et al. |
| 2014/0089314 A1 | 3/2014 | Iizuka et al. |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129627 A1* | 5/2014 | Baldwin ............ H04L 67/306 709/204 |
| 2014/0129953 A1 | 5/2014 | Spiegel |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0207860 A1 | 7/2014 | Wang et al. |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0279540 A1 | 9/2014 | Jackson |
| 2014/0280537 A1* | 9/2014 | Pridmore ............ H04L 51/32 709/204 |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0298210 A1 | 10/2014 | Park et al. |
| 2014/0304622 A1 | 10/2014 | Jorasch et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0331188 A1 | 11/2014 | Sandstrom et al. |
| 2014/0359024 A1 | 12/2014 | Spiegel |
| 2014/0359032 A1 | 12/2014 | Spiegel et al. |
| 2014/0372844 A1 | 12/2014 | Zumkhawala |
| 2014/0379683 A1 | 12/2014 | Bazaz |
| 2015/0020086 A1 | 1/2015 | Chen et al. |
| 2015/0040011 A1 | 2/2015 | Chun |
| 2015/0046278 A1 | 2/2015 | Pei et al. |
| 2015/0055197 A1 | 2/2015 | Romanoff et al. |
| 2015/0063724 A1 | 3/2015 | Ikeda et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0127754 A1 | 5/2015 | Clark et al. |
| 2015/0130178 A1* | 5/2015 | Clements ............ B42B 5/10 281/38 |
| 2015/0142753 A1 | 5/2015 | Soon-shiong |
| 2015/0169827 A1 | 6/2015 | Laborde |
| 2015/0172534 A1 | 6/2015 | Miyakawa et al. |
| 2015/0177937 A1 | 6/2015 | Poletto et al. |
| 2015/0178260 A1 | 6/2015 | Brunson |
| 2015/0199082 A1 | 7/2015 | Scholler et al. |
| 2015/0222814 A1 | 8/2015 | Li et al. |
| 2015/0227602 A1 | 8/2015 | Ramu et al. |
| 2015/0248683 A1 | 9/2015 | Walkingshaw |
| 2015/0261917 A1 | 9/2015 | Smith |
| 2015/0271779 A1 | 9/2015 | Alavudin |
| 2015/0312184 A1 | 10/2015 | Langholz et al. |
| 2015/0326510 A1 | 11/2015 | Tomlinson et al. |
| 2015/0350136 A1 | 12/2015 | Flynn, III et al. |
| 2015/0358806 A1 | 12/2015 | Salqvist |
| 2015/0365795 A1 | 12/2015 | Allen et al. |
| 2015/0367233 A1 | 12/2015 | Hicks et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0034253 A1 | 2/2016 | Bang et al. |
| 2016/0048369 A1 | 2/2016 | Zenoff |
| 2016/0085773 A1 | 3/2016 | Chang et al. |
| 2016/0085863 A1 | 3/2016 | Allen et al. |
| 2016/0085994 A1 | 3/2016 | Pereira |
| 2016/0086670 A1 | 3/2016 | Gross et al. |
| 2016/0092962 A1 | 3/2016 | Wasserman et al. |
| 2016/0099901 A1 | 4/2016 | Allen et al. |
| 2016/0105387 A1 | 4/2016 | Jackson |
| 2016/0180887 A1 | 6/2016 | Sehn |
| 2016/0182422 A1 | 6/2016 | Sehn |
| 2016/0182875 A1 | 6/2016 | Sehn |

(56) References Cited

U.S. PATENT DOCUMENTS

| | | |
|---|---|---|
| 2016/0239248 A1 | 8/2016 | Sehn |
| 2016/0253833 A1 | 9/2016 | Lew |
| 2016/0253912 A1 | 9/2016 | Heilman et al. |
| 2016/0277419 A1 | 9/2016 | Allen et al. |
| 2016/0321708 A1 | 11/2016 | Sehn |
| 2016/0352659 A1 | 12/2016 | Krishnamoorth |
| 2016/0359957 A1 | 12/2016 | Laliberte |
| 2016/0359987 A1 | 12/2016 | Laliberte |
| 2017/0006094 A1 | 1/2017 | Abou Mahmoud et al. |
| 2017/0061308 A1 | 3/2017 | Chen et al. |
| 2017/0111617 A1 | 4/2017 | Kuwahara et al. |
| 2017/0149717 A1 | 5/2017 | Sehn |
| 2017/0161382 A1 | 6/2017 | Ouimet et al. |
| 2017/0230315 A1 | 8/2017 | Zubas et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310888 A1 | 10/2017 | Wright et al. |
| 2017/0374003 A1 | 12/2017 | Allen et al. |
| 2017/0374508 A1 | 12/2017 | Davis et al. |
| 2018/0103002 A1 | 4/2018 | Sehn |
| 2018/0316575 A1 | 11/2018 | Son et al. |
| 2019/0237106 A1 | 8/2019 | Sehn |

FOREIGN PATENT DOCUMENTS

| | | |
|---|---|---|
| CN | 106663264 A | 5/2017 |
| CN | 107004225 A | 8/2017 |
| CN | 107111828 A | 8/2017 |
| CN | 107251006 A | 10/2017 |
| CN | 107637099 A | 1/2018 |
| CN | 107710772 A | 2/2018 |
| CN | 106663264 B | 5/2019 |
| CN | 110163663 | 8/2019 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 1020060038872 A | 5/2006 |
| KR | 1020080006729 A | 1/2008 |
| KR | 1020080017854 A | 2/2008 |
| KR | 20120121452 A | 11/2012 |
| KR | 1020120140404 A | 12/2012 |
| KR | 20130061724 | 6/2013 |
| KR | 20140066278 A | 6/2014 |
| KR | 1020140066795 A | 6/2014 |
| KR | 1020140115413 A | 10/2014 |
| KR | 10-1822920 | 1/2018 |
| KR | 101933840 B1 | 12/2018 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | 2012000107 | 1/2012 |
| WO | 2013008251 | 1/2013 |
| WO | WO-2013008238 | 1/2013 |
| WO | WO-2013045753 A1 | 4/2013 |
| WO | WO-2013058897 A1 | 4/2013 |
| WO | WO-2014068573 A1 | 5/2014 |
| WO | WO-2014093668 A1 | 6/2014 |
| WO | WO-2014115136 A1 | 7/2014 |
| WO | WO-2014194262 A2 | 12/2014 |
| WO | WO-2015192026 A1 | 12/2015 |
| WO | WO-2016007285 A1 | 1/2016 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | 2016/112299 | 7/2016 |
| WO | WO-2016149594 A1 | 9/2016 |
| WO | 2016179166 | 11/2016 |
| WO | 2016179235 | 11/2016 |
| WO | WO-2017106529 A1 | 6/2017 |
| WO | 2017176739 | 10/2017 |
| WO | 2017176992 | 10/2017 |
| WO | 2018005644 | 1/2018 |

OTHER PUBLICATIONS

US 10,425,370 B2, 09/2019, Allen et al. (withdrawn)
US 10,484,394 B2, 11/2019, Allen et al. (withdrawn)
"A Whole New Story", URL: https://www.snap.com/en-US/news/, (2017), 13 pgs.
"Adding a watermark to your photos", eBay, URL: http://pages.ebay.com/help/sell/pictures.html, (accessed May 24, 2017), 4 pgs.
"Android Getting Started Guide", VOXER Business, URL: https://voxer.com/assets/AndroidGuide.pdf, (Feb. 1, 2014), 18 pgs.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/494,226, Examiner Interview Summary dated Oct. 27, 2016", 3 pgs.
"U.S. Appl. No. 14/494,226, Examiner Interview Summary dated Dec. 20, 2017", 2 pgs.
"U.S. Appl. No. 14/494,226, Final Office Action dated Mar. 7, 2017", 34 pgs.
"U.S. Appl. No. 14/494,226, Final Office Action dated Jun. 1, 2018", 33 pgs.
"U.S. Appl. No. 14/494,226, Non Final Office Action dated Sep. 7, 2017", 36 pgs.
"U.S. Appl. No. 14/494,226, Non Final Office Action dated Sep. 12, 2016", 32 pgs.
"U.S. Appl. No. 14/494,226, Response filed Jan. 8, 2018 to Non Final Office Action dated Sep. 7, 2017", 15 pgs.
"U.S. Appl. No. 14/494,226, Response filed Jul. 7, 2017 to Final Office Action dated Mar. 7, 2017", 13 pgs.
"U.S. Appl. No. 14/494,226, Response filed Dec. 12, 2016 to Non Final Office Action dated Sep. 12, 2016", 16 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.

(56) References Cited

OTHER PUBLICATIONS

"U.S. Appl. No. 14/505,478, Response filed Mar. 4, 2016 to Non Final Office Action dated Sep. 4, 2015", 12 pgs.

"U.S. Appl. No. 14/505,478, Response filed Apr. 1, 2015 to Final Office Action dated Mar. 17, 2015", 6 pgs.

"U.S. Appl. No. 14/506,478, Response filed Aug. 17, 2015 to Advisory Action dated Apr. 14, 2015", 10 pgs.

"U.S. Appl. No. 14/510,016, Advisory Action dated Nov. 30, 2017", 7 pgs.

"U.S. Appl. No. 14/510,016, Final Office Action dated Sep. 8, 2017", 21 pgs.

"U.S. Appl. No. 14/510,016, Non Final Office Action dated Feb. 7, 2018", 36 pgs.

"U.S. Appl. No. 14/510,016, Non Final Office Action dated Apr. 21, 2017".

"U.S. Appl. No. 14/510,016, Response filed Jan. 8, 2017 to Final Office Action dated Sep. 8, 2017", 22 pgs.

"U.S. Appl. No. 14/510,016, Response Filed Jul. 21, 2017 to Non Final Office Action dated Apr. 21, 2017", 21 pgs.

"U.S. Appl. No. 14/510,016, Response filed Nov. 8, 2017 to Final Office Action dated Sep. 8, 2017", 24 pgs.

"U.S. Appl. No. 14/523,728, Non Final Office Action dated Dec. 12, 2014", 10 pgs.

"U.S. Appl. No. 14/523,728, Notice of Allowance dated Mar. 24, 2015", 8 pgs.

"U.S. Appl. No. 14/523,728, Notice of Allowance dated Apr. 15, 2015", 8 pgs.

"U.S. Appl. No. 14/523,728, Notice of Allowance dated Jun. 5, 2015", 8 pgs.

"U.S. Appl. No. 14/523,728, Response filed Aug. 25, 2014 to Non Final Office Action dated Jan. 16, 2015", 5 pgs.

"U.S. Appl. No. 14/529,064, Examiner Interview Summary dated May 23, 2016", 3 pgs.

"U.S. Appl. No. 14/529,064, Examiner Interview Summary dated Nov. 17, 2016", 3 pgs.

"U.S. Appl. No. 14/529,064, Final Office Action dated Jan. 25, 2018", 39 pgs.

"U.S. Appl. No. 14/529,064, Final Office Action dated Aug. 11, 2015", 23 pgs.

"U.S. Appl. No. 14/529,064, Final Office Action dated Aug. 24, 2016", 23 pgs.

"U.S. Appl. No. 14/529,064, Non Final Office Action dated Mar. 12, 2015", 20 pgs.

"U.S. Appl. No. 14/529,064, Non Final Office Action dated Apr. 6, 2017", 25 pgs.

"U.S. Appl. No. 14/529,064, Non Final Office Action dated Apr. 18, 2016", 21 pgs.

"U.S. Appl. No. 14/529,064, Response filed Feb. 5, 2015 to Restriction Requirement dated Feb. 2, 2015", 6 pgs.

"U.S. Appl. No. 14/529,064, Response filed Mar. 26, 2015 to Non Final Office Action dated Mar. 12, 2015", 8 pgs.

"U.S. Appl. No. 14/529,064, Response filed May 25, 2018 to Final Office Action dated Jan. 25, 2018", 20 pgs.

"U.S. Appl. No. 14/529,064, Response filed Jul. 18, 2016 to Non Final Office Action dated Apr. 18, 2016", 20 pgs.

"U.S. Appl. No. 14/529,064, Response filed Sep. 6, 2017 to Non Final Office Action dated Apr. 6, 2017", 19 pgs.

"U.S. Appl. No. 14/529,064, Response filed Sep. 6, 2017 to Non Final Office Action dated Apr. 6, 2017".

"U.S. Appl. No. 14/529,064, Response filed Oct. 12, 2015 to Final Office Action dated Aug. 11, 2015", 19 pgs.

"U.S. Appl. No. 14/529,064, Response filed Dec. 21, 2016 to Final Office Action dated Aug. 24, 2016", 17 pgs.

"U.S. Appl. No. 14/529,064, Restriction Requirement dated Feb. 2, 2015", 5 pgs.

"U.S. Appl. No. 14/539,391, Notice of Allowance dated Mar. 5, 2015", 17 pgs.

"U.S. Appl. No. 14/548,590, Advisory Action dated Nov. 18, 2016", 3 pgs.

"U.S. Appl. No. 14/548,590, Final Office Action dated Jul. 5, 2016", 16 pgs.

"U.S. Appl. No. 14/548,590, Final Office Action dated Jul. 18, 2017", 20 pgs.

"U.S. Appl. No. 14/548,590, Final Office Action dated Sep. 16, 2015", 15 pgs.

"U.S. Appl. No. 14/548,590, Non Final Office Action dated Jan. 9, 2017", 14 pgs.

"U.S. Appl. No. 14/548,590, Non Final Office Action dated Feb. 11, 2016", 16 pgs.

"U.S. Appl. No. 14/548,590, Non Final Office Action dated Apr. 20, 2015", 14 pgs.

"U.S. Appl. No. 14/548,590, Response filed May 9, 2017 to Non Final Office Action dated Jan. 9, 2017", 17 pgs.

"U.S. Appl. No. 14/548,590, Response filed May 10, 2016 to Non Final Office Action dated Feb. 11, 2016", 14 pgs.

"U.S. Appl. No. 14/548,590, Response filed Nov. 7, 2016 to Final Office Action dated Jul. 5, 2016", 14 pgs.

"U.S. Appl. No. 14/548,590, Response filed Dec. 16, 2015 to Final Office Action dated Sep. 16, 2015", 13 pgs.

"U.S. Appl. No. 14/548,590, Response filed Jun. 16, 2015 to Non Final Office Action dated Apr. 20, 2015", 19 pgs.

"U.S. Appl. No. 14/578,258, Examiner Interview Summary dated Nov. 25, 2015", 3 pgs.

"U.S. Appl. No. 14/578,258, Non Final Office Action dated Jun. 10, 2015", 12 pgs.

"U.S. Appl. No. 14/578,258, Notice of Allowance dated Feb. 26, 2016", 5 pgs.

"U.S. Appl. No. 14/578,258, Response filed Dec. 10, 2015 to Non Final Office Action dated Jun. 10, 2015", 11 pgs.

"U.S. Appl. No. 14/578,271, Corrected Notice of Allowance dated Oct. 30, 2017", 2 pgs.

"U.S. Appl. No. 14/578,271, Final Office Action dated Dec. 3, 2015", 15 pgs.

"U.S. Appl. No. 14/578,271, Non Final Office Action dated Aug. 7, 2015", 12 pgs.

"U.S. Appl. No. 14/578,271, Notice of Allowability dated Nov. 29, 2017", 3 pgs.

"U.S. Appl. No. 14/578,271, Notice of Allowance dated Aug. 1, 2017", 5 pgs.

"U.S. Appl. No. 14/578,271, Notice of Allowance dated Dec. 7, 2016", 7 pgs.

"U.S. Appl. No. 14/578,271, Response filed Feb. 9, 2016 to Final Office Action dated Dec. 3, 2015", 10 pgs.

"U.S. Appl. No. 14/578,271, Response filed Jun. 19, 2015 to Restriction Requirement dated Apr. 23, 2015", 6 pgs.

"U.S. Appl. No. 14/578,271, Response filed Oct. 28, 2015 to Non Final Office Action dated Aug. 7, 2015", 9 pgs.

"U.S. Appl. No. 14/578,271, Restriction Requirement dated Apr. 23, 2015", 8 pgs.

"U.S. Appl. No. 14/594,410, Non Final Office Action dated Jan. 4, 2016", 10 pgs.

"U.S. Appl. No. 14/594,410, Notice of Allowance dated Aug. 2, 2016", 5 pgs.

"U.S. Appl. No. 14/594,410, Notice of Allowance dated Dec. 15, 2016", 6 pgs.

"U.S. Appl. No. 14/594,410, Response filed Jul. 1, 2016 to Non Final Office Action dated Jan. 4, 2016", 10 pgs.

"U.S. Appl. No. 14/612,692, Examiner Interview Summary dated Jan. 29, 2016", 5 pgs.

"U.S. Appl. No. 14/612,692, Examiner Interview Summary dated May 14, 2018", 3 pgs.

"U.S. Appl. No. 14/612,692, Examiner Interview Summary dated Jul. 6, 2016", 4 pgs.

"U.S. Appl. No. 14/612,692, Examiner Interview Summary dated Aug. 14, 2015", 3 pgs.

"U.S. Appl. No. 14/612,692, Examiner Interview Summary dated Sep. 8, 2016", 3 pgs.

"U.S. Appl. No. 14/612,692, Examiner Interview Summary dated Nov. 13, 2017", 13 pgs.

"U.S. Appl. No. 14/612,692, Final Office Action dated Aug. 15, 2016", 18 pgs.

(56) References Cited

OTHER PUBLICATIONS

"U.S. Appl. No. 14/612,692, Final Office Action dated Aug. 25, 2017", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Jan. 9, 2018", 19 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response Filed May 9, 2018 to Non Final Office Action dated Jan. 9, 2018", 15 pgs.
"U.S. Appl. No. 14/612,692, Response filed Nov. 14, 2016 to Final Office Action dated Aug. 15, 2016", 15 pgs.
"U.S. Appl. No. 14/612,692, Response Filed Nov. 22, 2017 to Final Office Action dated Aug. 25, 2017", 11 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Examiner Interview Summary dated Aug. 7, 2017", 3 pgs.
"U.S. Appl. No. 14/634,417, Final Office Action dated Jan. 31, 2017", 27 pgs.
"U.S. Appl. No. 14/634,417, Non Final Office Action dated Jun. 8, 2017", 17 pgs.
"U.S. Appl. No. 14/634,417, Non Final Office Action dated Aug. 30, 2016", 23 pgs.
"U.S. Appl. No. 14/634,417, Notice of Allowance dated May 22, 2018", 9 pgs.
"U.S. Appl. No. 14/634,417, Notice of Allowance dated Oct. 25, 2017", 9 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Sep. 21, 2017 to Non Final Office Action dated Jun. 8, 2017", 16 pgs.
"U.S. Appl. No. 14/634,417, Response filed Nov. 30, 2016 to Non Final Office Action dated Aug. 30, 2016", 18 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Mar. 12, 2018", 7 pgs.
"U.S. Appl. No. 14/704,212, Non Final Office Action dated Jun. 16, 2017", 13 pgs.
"U.S. Appl. No. 14/704,212, Non Final Office Action dated Nov. 25, 2016", 13 pgs.
"U.S. Appl. No. 14/704,212, Non Final Office Action dated Dec. 4, 2015", 17 pgs.
"U.S. Appl. No. 14/704,212, Response filed Feb. 27, 2017 to Non Final Office Action dated Nov. 25, 2016", 14 pgs.
"U.S. Appl. No. 14/704,212, Response filed Mar. 4, 2016 to Non Final Office Action dated Dec. 4, 2015", 11 pgs.
"U.S. Appl. No. 14/704,212, Response filed Oct. 17, 2016 to Final Office Action dated Jun. 17, 2016", 12 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance dated Mar. 29, 2017", 17 pgs.
"U.S. Appl. No. 14/841,987, Notice of Allowance dated Aug. 7, 2017", 8 pgs.
"U.S. Appl. No. 14/967,472, Final Office Action dated Mar. 10, 2017", 15 pgs.
"U.S. Appl. No. 14/967,472, Final Office Action dated Jun. 25, 2018", 14 pgs.
"U.S. Appl. No. 14/967,472, Non Final Office Action dated Jan. 12, 2018", 17 pgs.
"U.S. Appl. No. 14/967,472, Non Final Office Action dated Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Mar. 16, 2018 Non Final Office Action dated Jan. 12, 2018", 13 pgs.
"U.S. Appl. No. 14/967,472, Response filed Jun. 7, 2017 to Final Office Action dated Mar. 10, 2017", 12 pgs.
"U.S. Appl. No. 14/967,472, Response filed Dec. 5, 2016 to Non Final Office Action dated Sep. 8, 2016", 11 pgs.
"U.S. Appl. No. 14/974,321, Examiner Interview Summary dated Dec. 5, 2017", 3 pgs.
"U.S. Appl. No. 14/974,321, Final Office Action dated Oct. 26, 2017", 16 pgs.
"U.S. Appl. No. 14/974,321, Non Final Office Action dated Jun. 29, 2017", 36 pgs.
"U.S. Appl. No. 14/974,321, Response filed Sep. 27, 2017 to Non Final Office Action dated Jun. 29, 2017", 13 pgs.
"U.S. Appl. No. 15/074,029, Final Office Action dated Jun. 28, 2018", 22 pgs.
"U.S. Appl. No. 15/074,029, Non Final Office Action dated Nov. 30, 2017", 16 pgs.
"U.S. Appl. No. 15/074,029, Response filed Feb. 28, 2018 to Non Final Office Action dated Nov. 30, 2017", 12 pgs.
"U.S. Appl. No. 15/137,608, Preliminary Amendment filed Apr. 26, 2016", 6 pgs.
"U.S. Appl. No. 15/152,975, Examiner Interview Summary dated May 14, 2018", 3 pgs.
"U.S. Appl. No. 15/152,975, Examiner Interview Summary dated Nov. 13, 2017", 13 pgs.
"U.S. Appl. No. 15/152,975, Final Office Action dated Jun. 30, 2017", 17 pgs.
"U.S. Appl. No. 15/152,975, Final Office Action dated Jul. 2, 2018", 19 pgs.
"U.S. Appl. No. 15/152,975, Non Final Office Action dated Jan. 10, 2018", 18 pgs.

(56) References Cited

OTHER PUBLICATIONS

"U.S. Appl. No. 15/152,975, Non Final Office Action dated Jan. 12, 2017", 36 pgs.

"U.S. Appl. No. 15/152,975, Preliminary Amendment filed May 19, 2016", 8 pgs.

"U.S. Appl. No. 15/152,975, Response Filed May 10, 2018 to Non Final Office Action dated Jan. 10, 2018", 13 pgs.

"U.S. Appl. No. 15/152,975, Response filed Jun. 12, 2017 to Non Final Office Action dated Jan. 12, 2017", 13 pgs.

"U.S. Appl. No. 15/152,975, Response filed Nov. 30, 2017 to Final Office Action dated Jun. 30, 2017", 9 pgs.

"U.S. Appl. No. 15/208,460, Notice of Allowance dated Feb. 27, 2017", 8 pgs.

"U.S. Appl. No. 15/208,460, Notice of Allowance dated Dec. 30, 2016", 9 pgs.

"U.S. Appl. No. 15/208,460, Supplemental Preliminary Amendment filed Jul. 18, 2016", 8 pgs.

"U.S. Appl. No. 15/212,095, Final Office Action dated Mar. 14, 2017", 9 pgs.

"U.S. Appl. No. 15/212,095, Non Final Office Action dated Feb. 2, 2017", 8 pgs.

"U.S. Appl. No. 15/212,095, Notice of Allowance dated Jun. 1, 2017", 8 pgs.

"U.S. Appl. No. 15/212,095, Notice of Allowance dated Sep. 8, 2017", 2 pgs.

"U.S. Appl. No. 15/212,095, Response filed Feb. 28, 2017 to Non Final Office Action dated Feb. 2, 2017", 2 pgs.

"U.S. Appl. No. 15/212,095, Response filed May 15, 2017 to Final Office Action dated Mar. 14, 2017", 2 pgs.

"U.S. Appl. No. 15/224,312, Final Office Action dated Apr. 20, 2018", 22 pgs.

"U.S. Appl. No. 15/224,312, Non Final Office Action dated Oct. 11, 2017", 29 pgs.

"U.S. Appl. No. 15/224,312, Preliminary Amendment filed Feb. 1, 2017", 11 pgs.

"U.S. Appl. No. 15/224,343, Final Office Action dated Apr. 19, 2018", 20 pgs.

"U.S. Appl. No. 15/224,343, Non Final Office Action dated Oct. 4, 2017", 26 pgs.

"U.S. Appl. No. 15/224,343, Preliminary Amendment filed Jan. 31, 2017", 10 pgs.

"U.S. Appl. No. 15/224,343, Response filed Mar. 5, 2018 to Non Final Office Action dated Oct. 4, 2017", 23 pgs.

"U.S. Appl. No. 15/224,355, Examiner Interview Summary dated Oct. 25, 2017", 3 pgs.

"U.S. Appl. No. 15/224,355, Final Office Action dated Apr. 24, 2018", 20 pgs.

"U.S. Appl. No. 15/224,355, Non Final Office Action dated Sep. 6, 2017", 30 pgs.

"U.S. Appl. No. 15/224,355, Preliminary Amendment filed Apr. 3, 2017", 12 pgs.

"U.S. Appl. No. 15/224,355, Response filed Mar. 6, 2018 to Non Final Office Action dated Sep. 6, 2017", 25 pgs.

"U.S. Appl. No. 15/224,359, Final Office Action dated Apr. 2, 2018", 18 pgs.

"U.S. Appl. No. 15/224,359, Non Final Office Action dated Jul. 20, 2017", 33 pgs.

"U.S. Appl. No. 15/224,359, Response filed Jan. 22, 2018 to Non Final Office Action dated Jul. 20, 2017", 13 pgs.

"U.S. Appl. No. 15/224,365, Final Office Action dated Apr. 2, 2018", 19 pgs.

"U.S. Appl. No. 15/224,365, Non Final Office Action dated Aug. 8, 2017", 41 pgs.

"U.S. Appl. No. 15/224,365, Response filed Feb. 8, 2018 to Non Final Office Action dated Aug. 8, 2017", 14 pgs.

"U.S. Appl. No. 15/224,372, Final Office Action dated Apr. 3, 2018", 18 pgs.

"U.S. Appl. No. 15/224,372, Non Final Office Action dated Aug. 7, 2017", 40 pgs.

"U.S. Appl. No. 15/224,372, Preliminary Amendment filed May 5, 2017", 10 pgs.

"U.S. Appl. No. 15/224,372, Response filed Jan. 8, 2017 to Non Final Office Action dated Aug. 7, 2017", 22 pgs.

"U.S. Appl. No. 15/224,377, Final Office Action dated Jan. 2, 2018", 29 pgs.

"U.S. Appl. No. 15/224,377, Non Final Office Action dated Jun. 15, 2018", 19 pgs.

"U.S. Appl. No. 15/224,377, Non Final Office Action dated Aug. 4, 2017", 41 pgs.

"U.S. Appl. No. 15/224,377, Response filed Dec. 6, 2017 to Non Final Office Action dated Aug. 4, 2017", 22 pgs.

"U.S. Appl. No. 15/224,383, Examiner Interview Summary dated Oct. 25, 2017", 3 pgs.

"U.S. Appl. No. 15/224,383, Final Office Action dated Feb. 14, 2018", 25 pgs.

"U.S. Appl. No. 15/224,383, Non Final Office Action dated Jul. 5, 2018", 19 pgs.

"U.S. Appl. No. 15/224,383, Non Final Office Action dated Aug. 30, 2017", 26 pgs.

"U.S. Appl. No. 15/224,383, Preliminary Amendment filed May 9, 2017", 13 pgs.

"U.S. Appl. No. 15/224,383, Response filed Jan. 3, 2018 to Non Final Office Action dated Aug. 30, 2017", 25 pgs.

"U.S. Appl. No. 15/224,383, Response filed Jun. 14, 2018 to Final Office Action dated Feb. 14, 2018", 14 pgs.

"U.S. Appl. No. 15/224,359, Preliminary Amendment filed Apr. 9, 2017", 8 pgs.

"U.S. Appl. No. 15/298,806, Advisory Action dated Jan. 29, 2018", 4 pgs.

"U.S. Appl. No. 15/298,806, Examiner Interview Summary dated Jan. 12, 2018", 3 pgs.

"U.S. Appl. No. 15/298,806, Final Office Action dated Oct. 24, 2017", 15 pgs.

"U.S. Appl. No. 15/298,806, Non Final Office Action dated May 17, 2018", 16 pgs.

"U.S. Appl. No. 15/298,806, Non Final Office Action dated Jun. 12, 2017", 26 pgs.

"U.S. Appl. No. 15/298,806, Preliminary Amendment filed Oct. 21, 2016", 8 pgs.

"U.S. Appl. No. 15/298,806, Response filed Jan. 9, 2018 to Final Office Action dated Oct. 24, 2017", 17 pgs.

"U.S. Appl. No. 15/298,806, Response filed Sep. 12, 2017 to Non Final Office Action dated Jun. 12, 2017", 12 pgs.

"U.S. Appl. No. 15/416,846, Notice of Allowance dated Jul. 19, 2017", 9 pgs.

"U.S. Appl. No. 15/416,846, Preliminary Amendment filed Feb. 28, 2017", 10 pgs.

"U.S. Appl. No. 15/486,111, Corrected Notice of Allowance dated Sep. 7, 2017", 3 pgs.

"U.S. Appl. No. 15/486,111, Non Final Office Action dated May 9, 2017", 17 pgs.

"U.S. Appl. No. 15/486,111, Notice of Allowance dated Aug. 30, 2017", 5 pgs.

"U.S. Appl. No. 15/486,111, Response filed Aug. 9, 2017 to Non Final Office Action dated May 9, 2017", 11 pgs.

"U.S. Appl. No. 15/702,511, Preliminary Amendment filed Sep. 15, 2017", 13 pgs.

"U.S. Appl. No. 15/729,582, Non Final Office Action dated May 25, 2018", 14 pgs.

"U.S. Appl. No. 15/787,467, Non Final Office Action dated Apr. 18, 2018", 17 pgs.

"U.S. Appl. No. 15/787,467, Preliminary Amendment filed Oct. 26, 2017", 11 pgs.

"U.S. Appl. No. 15/835,100, Non Final Office Action dated Jan. 23, 2018", 18 pgs.

"U.S. Appl. No. 16/000,657, Preliminary Amendment filed Jun. 6, 2018", 8 pgs.

"BlogStomp", URL: http://stompsoftware.com/blogstomp, (accessed May 24, 2017), 12 pgs.

"Canadian Application Serial No. 2,894,332 Response filed Jan. 24, 2017 to Office Action dated Aug. 16, 2016", 15 pgs.

(56) References Cited

OTHER PUBLICATIONS

"Canadian Application Serial No. 2,894,332, Office Action dated Aug. 16, 2016", 4 pgs.
"Canadian Application Serial No. 2,894,332, Request for Reinstatement filed Jun. 11, 2018", w/ Amended Claims, 17 pgs.
"Canadian Application Serial No. 2,910,158, Office Action dated Jun. 6, 2018", 5 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"Chinese Application Serial No. 201580031616.8, Office Action dated Oct. 9, 2017", w/ English Translation, 18 pgs.
"Chinese Application Serial No. 201580031616.8, Response filed Feb. 26, 2018 to Office Action dated Oct. 9, 2017", w/ English Translation, 8 pgs.
"Cup Magic Starbucks Holiday Red Cups come to life with AR app", URL: http://www.blastradius.com/work/cup-magic, (2016), 7 pgs.
"Daily App: InstaPlace (iOS/Android): Give Pictures a Sense of Place", TechPP, URL: http://techpp.com/2013/02/15/instaplace-app-review, (2013), 13 pgs.
"European Application Serial No. 14804343.3, Extended European Search Report dated Sep. 29, 2016", 12 pgs.
"European Application Serial No. 15733026.7, Communication Pursuant to Article 94(3) EPC dated Jul. 28, 2017", 6 pgs.
"European Application Serial No. 15733026.7, Response filed Jan. 30, 2018 to Communication Pursuant to Article 94(3) EPC dated Jul. 28, 2017", w/ Amended Claims, 37 pgs.
"European Application Serial No. 15782165.3, Response filed Oct. 17, 2017 to Communication pursuant to Rules 161(1) and 162 EPC dated May 10, 2017", 15 pgs.
"European Application Serial No. 15787854.7, Response filed Dec. 11, 2017 to Communication Pursuant to Rules 161(1) and 162 EPC dated Jun. 1, 2017", 16 pgs.
"European Application Serial No. 15870861.0, Response filed Aug. 9, 2017 to Communication Pursuant to Rules 161(2) and 162 EPC dated Aug. 4, 2017", 10 pgs.
"European Application Serial No. 15870874.3, Extended European Search Report dated Nov. 29, 2017", 7 pgs.
"How Snaps Are Stored And Deleted", Snapchat, URL: https://web.archive.org/web/20130607042322/http://blog.snapchat.com/post/50060403002/how-snaps-are-stored-and-deleted, (May 9, 2013), 2 pgs.
"InstaPlace Photo App Tell The Whole Story", URL: https://youtu.be/uF_gFkg1hBM, (Nov. 8, 2013), 113 pgs.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.
"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Preliminary Report on Patentability dated Jun. 29, 2017", 7 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2016/066976, International Search Report dated May 17, 2017", 7 pgs.
"International Application Serial No. PCT/US2016/066976, Invitation to Pay Add'l Fees and Partial Search Rpt dated Mar. 6, 2017", 8 pgs.
"International Application Serial No. PCT/US2016/066976, Written Opinion dated May 17, 2017", 7 pgs.
"Introducing Snapchat Stories", URL: https://www.youtube.com/watch?v=88Cu3yN-LIM, (Oct. 3, 2013), 92 pgs.
"IVisit Mobile: Getting Started", iVisit, (Dec. 4, 2013), 1-16.
"Korean Application Serial No. 10-2017-7001104, Response filed Jul. 25, 2017 to Office Action dated Jun. 26, 2017", w/ Translation of Claims, 20 pgs.
"Korean Application Serial No. 10-2017-7020217, Final Office Action dated Jan. 31, 2018", w/ English Translation, 10 pgs.
"Korean Application Serial No. 10-2017-7020217, Office Action dated Sep. 15, 2017", w/ English Translation, 11 pgs.
"Korean Application Serial No. 10-2017-7020217, Response filed Feb. 23, 2018 to Final Office Action dated Jan. 31, 2018", w/ English Translation, 13 pgs.
"Korean Application Serial No. 10-2017-7020217, Response filed Nov. 2, 2017 to Office Action dated Sep. 15, 2017", w/ English Translation, 17 pgs.
"Korean Application Serial No. 10-2018-7002127, Notice of Preliminary Rejection dated Apr. 10, 2018", w/ English Translation, 4 pgs.
"Korean Application Serial No. 10-2018-7002127, Response filed May 16, 2018 to Notice of Preliminary Rejection dated Apr. 10, 2018", w/ English Claims, 14 pgs.
"Korean Office Action Application Serial. No. 10-2017-7001104, Office Action dated Jun. 26, 2017", w/ English Translation, 12 pgs.
"Macy's Believe-o-Magic", URL: https://www.youtube.com/watch?v=xvzRXy3J0Z0, (Nov. 7, 2011), 102 pgs.
"Macys Introduces Augmented Reality Experience in Stores across Country as Part of Its 2011 Believe Campaign", URL: https://www.businesswire.com/news/home/20111102006759/en/Macys-Introduces-Augmented-Reality-Experience-Stores-Country, (Nov. 2, 2011), 6 pgs.
"Pluraleyes by Red Giant", © 2002-2015 Red Giant LLC, URL: http://www.redgiant.com/products/pluraleyes/, (Accessed Nov. 11, 2015), 5 pgs.

(56) References Cited

OTHER PUBLICATIONS

"Starbucks Cup Magic", URL: https://www.youtube.com/watch?v=RWwQXi9RG0w, (Nov. 8, 2011), 87 pgs.
"Starbucks Cup Magic for Valentine's Day", URL: https://www.youtube.com/watch?v=8nvqOzjq10w, (Feb. 6, 2012), 88 pgs.
"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.
"To Err is Human. To Self Destruct Messages, There is iDelete for iOS", The Apple Google, URL: http://theapplegoogle.com/2013/04/err-human-destruct-messages-idelete-ios/>, archived on Apr. 12, 2013 at w ayback machine, 2 pgs.
Carthy, Roi, "Dear All Photo Apps: Mobli Just Won Filters", URL: https://techcrunch.com/2011/09/08/mobli-filters, (Sep. 8, 2011), 10 pgs.
Castelluccia, Claude, et al., "EphPub: Toward robust Ephemeral Publishing", Network Protocols (ICNP), 2011 19th IEEE International Conference on, IEEE, (Oct. 17, 2011), 18 pgs.
Chen, Datong, et al., "Protecting Personal Identification in Video", Protecting Privacy in Video Surveillance, Springer-Verlag London Ltd., (2009), 115-128.
Clarke, Tangier, "Automatically syncing multiple clips and lots of audio like PluralEyes possible?", URL: https://forums.creativecow.net/thread/344/20553, (May 21, 2013), 8 pgs.
Fajman, "An Extensible Message Format for Message Disposition Notifications", Request for Comments: 2298, National Institutes of Health, (Mar. 1998), 28 pgs.
Janthong, Isaranu, "Android App Review Thailand", URL: http://www.android-free-app-review.com/2013/01/instaplace-android-google-play-store.html, (Jan. 23, 2013), 9 pgs.
Leyden, John, "This SMS will self-destruct in 40 seconds", URL: http://www.theregister.co.uk/2005/12/12/stealthtext/, (Dec. 12, 2005), 1 pg.
MacLeod, Duncan, "Macys Believe-o-Magic App", URL: http://theinspirationroom.com/daily/2011/macys-believe-o-magic-app, (Nov. 14, 2011), 10 pgs.
MacLeod, Duncan, "Starbucks Cup Magic Lets Merry", URL: http://theinspirationroom.com/daily/2011/starbucks-cup-magic, (Nov. 12, 2011), 8 pgs.
Melanson, Mike, "This text message will self destruct in 60 seconds", URL: http://readwrite.com/2011/02/11/this_text_message_will_self_destruct_in_60_seconds, (Feb. 18, 2015), 4 pgs.
Notopoulos, Katie, "A Guide To The New Snapchat Filters And Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.
Panzarino, Matthew, "Snapchat Adds Filters, A Replay Function And For Whatever Reason, Time, Temperature And Speed Overlays", URL: https://techcrunch.com/2013/12/20/snapchat-adds-filters-new-font-and-for-some-reason-time-temperature-and-speed-overlays/, (Dec. 20, 2013), 12 pgs.
Sawers, Paul, "Snapchat for iOS Lets You Send Photos to Friends and Set How long They're Visible For", URL: https://thenextweb.com/apps/2012/05/07/snapchat-for-ios-lets-you-send-photos-to-friends-and-set-how-long-theyre-visible-for/, (May 7, 2012), 5 pgs.
Shein, Esther, "Ephemeral Data", Communications of the ACM vol. 56 | No. 9, (Sep. 2013), 20-22.
Trice, Andrew, "My Favorite New Feature: Multi-Clip Sync in Premiere Pro CC", URL: http://www.tricedesigns.com/2013/06/18/my-favorite-new-feature-multi-cam-synch-in-premiere-pro-cc/, (Jun. 18, 2013), 5 pgs.
Tripathi, Rohit, "Watermark Images in PHP And Save File on Server", URL: http://code.rohitink.com/2012/12/28/watermark-images-in-php-and-save-file-on-server, (Dec. 28, 2012), 4 pgs.
"U.S. Appl. No. 14/612,692, Notice of Allowance dated Jul. 5, 2018", 11 pgs.
"U.S. Appl. No. 15/787,467, Response filed Jul. 18, 2018 to Non Final Office Action dated Apr. 18, 2018", 12 pgs.

"U.S. Appl. No. 14/529,064, Non Final Office Action dated Jul. 13, 2018", 38 pgs.
"U.S. Appl. No. 15/224,343, Response filed Jul. 19, 2018 to Final Office Action dated Apr. 19, 2018", 16 pgs.
"U.S. Appl. No. 15/224,372, Response filed Aug. 3, 2018 to Final Office Action dated Apr. 3, 2018", 14 pgs.
"U.S. Appl. No. 15/298,806, Response filed Aug. 10, 2018 to Non Final Office Action dated May 17, 2018", 15 pgs.
"U.S. Appl. No. 15/298,806, Examiner Interview Summary dated Aug. 13, 2013", 3 pgs.
"Korean Application Serial No. 10-2017-7014135, Notice of Preliminary Rejection dated Jul. 20, 2018", w English Translation, 13 pgs.
"Chinese Application Serial No. 201580031616.8, Office Action dated Jul. 2, 2018", w English translation, 8 pgs.
"U.S. Appl. No. 15/224,312, Response filed Aug. 20, 2018 to Final Office Action dated Apr. 20, 2018", 16 pgs.
"U.S. Appl. No. 15/224,383, Examiner Interview Summary dated Aug. 15, 2018", 4 pgs.
"U.S. Appl. No. 15/074,029, Response filed Aug. 28, 2018 to Final Office Action dated Jun. 28, 2018", 21 pgs.
"U.S. Appl. No. 15/224,359, Response filed Sep. 4, 2018 to Final Office Action dated Apr. 2, 2018", 14 pgs.
"U.S. Appl. No. 15/224,343, Non Final Office Action dated Sep. 4, 2018", 20 pgs.
"U.S. Appl. No. 15/224,372, Non Final Office Action dated Sep. 14, 2018", 20 pgs.
"U.S. Appl. No. 15/787,467, Notice of Allowance dated Aug. 31, 2018", 8 pgs.
"U.S. Appl. No. 15/298,806, Notice of Allowance dated Sep. 19, 2018", 5 pgs.
"U.S. Appl. No. 15/152,975, Response filed Sep. 19, 2018 to Final Office Action dated Jul. 2, 2018", 14 pgs.
"U.S. Appl. No. 15/787,467, Corrected Notice of Allowability dated Sep. 24, 2018", 2 pgs.
"U.S. Appl. No. 15/224,355, Response filed Sep. 24, 2018 to Final Office Action dated Apr. 24, 2018", 19 pgs.
"U.S. Appl. No. 14/967,472, Response filed Sep. 21, 2018 to Final Office Action dated Jun. 25, 2018", 11 pgs.
"U.S. Appl. No. 15/224,359, Non Final Office Action dated Sep. 28, 2018", 15 pgs.
"U.S. Appl. No. 15/152,975, Non Final Office Action dated Sep. 28, 2018", 28 pgs.
"U.S. Appl. No. 15/224,365, Resonse filed Oct. 2, 2018 to Final Office Action dated Apr. 2, 2018", 15 pgs.
"U.S. Appl. No. 15/074,029, Advisory Action dated Oct. 11, 2018", 3 pgs.
"Korean Application Serial No. 10-2017-7014135, Response filed Sep. 17, 2018 to Notice of Preliminary Rejection dated Jul. 20, 2018", w English Claims, 16 pgs.
Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.
U.S. Appl. No. 14/494,226, filed Sep. 23, 2014, User Interface to Augment an Image Using Geolocation.
U.S. Appl. No. 14/612,692, filed Feb. 3, 2015, Multichannel System.
U.S. Appl. No. 15/152,975, filed May 12, 2016, Multichannel System.
U.S. Appl. No. 15/074,029, filed Mar. 18, 2016, Geo-fence Authorization Provisioning.
U.S. Appl. No. 15/702,511, filed Sep. 12, 2017, Ephemeral Gallery of Ephemeral Messages.
U.S. Appl. No. 15/947,350, filed Apr. 6, 2018, Automated Chronological Display of Ephemeral Message Gallery (as amended).
U.S. Appl. No. 14/505,478, U.S. Pat. No. 9,537,811, filed Oct. 2, 2014, Ephemeral Gallery of Ephemeral Messages.
U.S. Appl. No. 15/224,312, filed Jul. 29, 2016, Gallery of Ephemeral Messages.
U.S. Appl. No. 15/224,355, filed Jul. 29, 2016, Ephemeral Gallery Elimination Based on Gallery and Message Timers (as amended).
U.S. Appl. No. 15/224,343, filed Jul. 29, 2016, Ephemeral Gallery of Visual Messages.

(56) References Cited

OTHER PUBLICATIONS

U.S. Appl. No. 15/224,359, filed Jul. 29, 2016, Epheemeral Gallery User Interface With Remaining Gallery Time Indication.
U.S. Appl. No. 15/224,365, filed Jul. 29, 2016, Gallery User Interface With Last Posted Message Indication (as amended).
U.S. Appl. No. 15/224,372, filed Jul. 29, 2016, Ephemeral Message Gallery User Interface With Screenshot Messages.
U.S. Appl. No. 15/224,377, filed Jul. 29, 2016, Ephemeral Message Gallery User Interface With Online Viewing History Indicia.
U.S. Appl. No. 15/224,383, filed Jul. 29, 2016, Multi-user Ephemeral Message Gallery.
U.S. Appl. No. 14/578,271, U.S. Pat. No. 9,854,219, filed Dec. 19, 2014, Gallery of Videos Set to an Audio Time Line.
U.S. Appl. No. 14/967,472, filed Dec. 14, 2015, Gallery of Videos Set to an Audio Time Line.
U.S. Appl. No. 14/634,417, filed Feb. 27, 2015, Ephemeral Gallery of Ephemeral Messages With Opt-in Permanence.
U.S. Appl. No. 16/000,657, filed Jun. 5, 2018, Ephemeral Gallery of Ephemeral Messages With Opt-in Permanence.
U.S. Appl. No. 14/304,855, U.S. Pat. No. 9,113,301, filed Jun. 13, 2014, Geo-location Based Event Gallery.
U.S. Appl. No. 14/738,069, U.S. Pat. No. 9,532,171, filed Jun. 12, 2015, Geo-location Based Event Gallery.
U.S. Appl. No. 15/298,806, filed Oct. 20, 2016, Geo-location Based Event Gallery.
U.S. Appl. No. 14/529,064, filed Oct. 30, 2014, Priority Based Placement of Messages in Geo-location Based Event Gallery.
U.S. Appl. No. 14/578,258, U.S. Pat. No. 9,385,983, filed Dec. 19, 2014, Gallery of Messages From Individuals With a Shared Interest.
U.S. Appl. No. 15/137,608, filed Apr. 25, 2016, Gallery of Messages From Individuals With a Shared Interest.
U.S. Appl. No. 14/523,728, U.S. Pat. No. 9,094,137, filed Oct. 24, 2014, Priority Based Placement of Messages in a Geo-location Based Event Gallery.
U.S. Appl. No. 14/808,283, U.S. Pat. No. 9,430,783, filed Jul. 24, 2015, Prioritization of Messages Within Gallery.
U.S. Appl. No. 15/208,460, U.S. Pat. No. 9,693,191, filed Jul. 12, 2016, Prioritization of Messages Within Gallery.
U.S. Appl. No. 15/416,846, U.S. Pat. No. 9,825,898, filed Jan. 26, 2017, Prioritization of Messages Within a Message Collection.
U.S. Appl. No. 15/787,467, filed Oct. 18, 2017, Prioritization of Messages Within a Message Collection.
U.S. Appl. No. 14/723,400, U.S. Pat. No. 9,396,354, filed May 27, 2015, Apparatus and Method for Automated Privacy Protection in Distributed Images.
U.S. Appl. No. 15/212,094, U.S. Pat. No. 9,785,796, filed Jul. 15, 2016, Apparatus and Methos for Automated Privacy Protection in Distributed Images.
U.S. Appl. No. 15/729,582, filed Oct. 10, 2017, Apparatus and Method for Automated Privacy Protection in Distributed Images.
U.S. Appl. No. 16/219,577, filed Dec. 13, 2018, Geo-location Based Event Gallery.
U.S. Appl. No. 16/204,886, filed Nov. 29, 2018, Prioritization of Messages Within a Message Collection.
"U.S. Appl. No. 14/967,472, Notice of Allowance dated Jan. 24, 2019", 6 pgs.
"U.S. Appl. No. 15/074,029, Non Final Office Action dated Jan. 23, 2019", 19 pgs.
"U.S. Appl. No. 15/137,608, Amendment and Response filed Jan. 25, 2019 to Non Final Office Action dated Nov. 2, 2018", 13 pgs.
"U.S. Appl. No. 15/137,608, Non Final Office Action dated Nov. 2, 2018", 10 pgs.
"U.S. Appl. No. 15/152,975, Examiner Interview Summary dated Feb. 4, 2019", 7 pgs.
"U.S. Appl. No. 15/152,975, Response filed Jan. 28, 2019 to Non Final Office Action dated Sep. 28, 2019", 17 pgs.
"U.S. Appl. No. 15/224,312, Non Final Office Action dated Oct. 22, 2018", 15 pgs.
"U.S. Appl. No. 15/224,355, Non Final Office Action dated Dec. 20, 2018", 14 pgs.
"U.S. Appl. No. 15/224,365, Non Final Office Action dated Jan. 3, 2019", 11 pgs.
"U.S. Appl. No. 15/224,372, Resonse filed Jan. 16, 2019 to Non Final Office Action dated Sep. 14, 2018", 18 pgs.
"U.S. Appl. No. 15/224,377, Final Office Action dated Feb. 6, 2019", 14 pgs.
"U.S. Appl. No. 15/224,377, Response filed Dec. 17, 2018 to Non Final Office Action dated Jun. 15, 2018", 13 pgs.
"U.S. Appl. No. 15/224,383, Final Office Action dated Jan. 14, 2019", 15 pgs.
"U.S. Appl. No. 15/224,383, Response Filed Dec. 5, 2018 to Non Final Office Action dated Jul. 5, 2018", 16 pgs.
"U.S. Appl. No. 15/702,511, Notice of Allowance dated Oct. 26, 2018", 7 pgs.
"U.S. Appl. No. 15/729,582, Final Office Action dated Dec. 13, 2018", 14 pgs.
"U.S. Appl. No. 16/204,886, Non Final Office Action dated Jan. 4, 2019", 8 pgs.
"Canadian Application Serial No. 2,910,158, Response filed Dec. 6, 2018 to Office Action dated Jun. 6, 2018", w/ English Claims, 18 pgs.
"European Application Serial No. 15733026.7, Summons to Attend Oral Proceedings dated Jan. 10, 2019", 7 pgs.
"U.S. Appl. No. 14/494,226, Appeal Brief filed Mar. 1, 2019 in response to Final Office Action dated Jun. 1, 2018", 29 pgs.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/967,472, Corrected Notice of Allowability dated Mar. 18, 2019", 3 pgs.
"U.S. Appl. No. 14/967,472, Corrected Notice of Allowability dated Apr. 24, 2019", 3 pgs.
"U.S. Appl. No. 15/074,029, Notice of Allowance dated Jun. 19, 2019", 14 pgs.
"U.S. Appl. No. 15/074,029, Response filed Apr. 23, 2019 to Non Final Office Action dated Jan. 23, 2019", 15 pgs.
"U.S. Appl. No. 15/137,608, Final Office Action dated May 13, 2019", 10 pgs.
"U.S. Appl. No. 15/152,975, Notice of Allowance dated May 17, 2019", 13 pgs.
"U.S. Appl. No. 15/224,312, Final Office Action dated Apr. 11, 2019", 15 pgs.
"U.S. Appl. No. 15/224,312, Response filed Feb. 22, 2019 to Non Final Office Action dated Oct. 22, 2018", 14 pgs.
"U.S. Appl. No. 15/224,343, Amendment and Response filed Feb. 4, 2019 to Non Final Office Action dated Sep. 4, 2018", 18 pgs.
"U.S. Appl. No. 15/224,343, Final Office Action dated Mar. 22, 2019", 17 pgs.
"U.S. Appl. No. 15/224,355, Response filed May 20, 2019 to Non Final Office Action dated Dec. 20, 2018", 13 pgs.
"U.S. Appl. No. 15/224,359, Final Office Action dated Apr. 11, 2019", 15 pgs.
"U.S. Appl. No. 15/224,359, Response filed Feb. 28, 2019 to Non Final Office Action dated Aug. 28, 2018", 16 pgs.
"U.S. Appl. No. 15/224,365, Response filed Jun. 3, 2019 to Non-Final Office Action dated Jan. 3, 2019", 12 pgs.
"U.S. Appl. No. 15/224,372, Final Office Action dated Mar. 6, 2019", 17 pgs.
"U.S. Appl. No. 15/224,377, Examiner Interview Summary dated Mar. 4, 2019", 5 pgs.
"U.S. Appl. No. 15/224,377, Response filed Jun. 6, 2019 to Final Office Action dated Feb. 6, 2019", 10 pgs.
"U.S. Appl. No. 15/224,383, Response filed May 14, 2019 to Final Office Action dated Jan. 14, 2019", 15 pgs.
"U.S. Appl. No. 15/702,511, 312 Amendment filed Jun. 26, 2019", 11 pgs.
"U.S. Appl. No. 15/702,511, Notice of Allowance dated Mar. 26, 2019", 7 pgs.
"U.S. Appl. No. 15/729,582, Response filed May 13, 2019 to Final Office Action dated Dec. 13, 2018", 9 pgs.
"U.S. Appl. No. 16/204,886, Notice of Allowance dated May 15, 2019", 9 pgs.

(56) References Cited

OTHER PUBLICATIONS

"U.S. Appl. No. 16/204,886, Response filed Apr. 2, 2019 to Non Final Office Action dated Jan. 4, 2019", 8 pgs.
"Korean Application Serial No. 10-2017-7014135, Final Office Action dated Feb. 28, 2019", w/ English Translation, 7 pgs.
"Korean Application Serial No. 10-2017-7014135, Notice of Preliminary Rejection dated Apr. 19, 2019", w/ English Translation, 14 pgs.
"Korean Application Serial No. 10-2017-7014135, Response filed Mar. 29, 2019 to Final Office Action dated Feb. 28, 2019", w/ English Claims, 14 pgs.
"Korean Application Serial No. 10-2017-7014135, Response filed Jun. 19, 2019 to Notice of Preliminary Rejection dated Apr. 19, 2019", w/ English Claims, 16 pgs.
"Korean Application Serial No. 10-2018-7037070, Notice of Preliminary Rejection dated Mar. 20, 2019", w/ English Translation, 10 pgs.
"Korean Application Serial No. 10-2018-7037070, Response filed May 14, 2019 to Notice of Preliminary Rejection dated Mar. 20, 2019", 10 pgs.
U.S. Appl. No. 16/529,461, filed Aug. 1, 2019, Multichannel System.
U.S. Appl. No. 16/541,919, filed Aug. 15, 2019, Geo-fence Authorization Provisioning.
U.S. Appl. No. 16/376,598, filed Apr. 5, 2019, Gallery of Videos Set to an Audio Time Line.
U.S. Appl. No. 16/511,834, filed Jul. 15, 2019, Prioritization of Messages Within a Message Collection.
"U.S. Appl. No. 15/224,372, Response filed Jul. 8, 2019 to Final Office Action dated Mar. 6, 2019", 14 pgs.
"U.S. Appl. No. 15/137,608, Response filed Jul. 12, 2019 to Final Office Action dated May 13, 2019", 10 pgs.
"U.S. Appl. No. 16/204,886, Corrected Notice of Allowability dated Jul. 15, 2019", 2 pgs.
"U.S. Appl. No. 15/729,582, Notice of Allowance dated Jul. 22, 2019", 9 pgs.
"U.S. Appl. No. 16/376,598, Non Final Office Action dated Jul. 25, 2019", 7 pgs.
"U.S. Appl. No. 16/204,886, Corrected Notice of Allowability dated Aug. 6, 2019", 2 pgs.
"U.S. Appl. No. 16/219,577, Restriction Requirement dated Aug. 7, 2019", 6 pgs.
"U.S. Appl. No. 15/137,608, Notice of Allowance dated Aug. 8, 2019", 7 pgs.
"U.S. Appl. No. 15/224,355, Final Office Action dated Aug. 9, 2019", 15 pgs.
"European Application Serial No. 15733026.7, Response filed Aug. 9, 2019 to Summons to Attend Oral Proceedings dated Jan. 10, 2019", w/ English Claims, 19 pgs.
"U.S. Appl. No. 15/702,511, PTO Response to Rule 312 Communication dated Aug. 13, 2019", 2 pgs.
"U.S. Appl. No. 15/224,312, Response filed Aug. 12, 2019 to Final Office Action dated Apr. 11, 2019", 14 pgs.
"U.S. Appl. No. 15/074,029, Corrected Notice of Allowability dated Aug. 20, 2019", 10 pgs.
"U.S. Appl. No. 16/511,834, Non-Final Office Action dated Aug. 20, 2019", 11 pgs.
"U.S. Appl. No. 15/224,365, Final Office Action dated Aug. 23, 2019", 12 pgs.
"U.S. Appl. No. 15/224,343, Response filed Aug. 22, 2019 to Final Office Action dated Mar. 22, 2019", 16 pgs.
"U.S. Appl. No. 15/224,312, Advisory Action dated Aug. 27, 2019", 3 pgs.
"U.S. Appl. No. 16/204,886, Corrected Notice of Allowability dated Sep. 10, 2019", 2 pgs.
"U.S. Appl. No. 15/224,359, Response filed Sep. 11, 2019 to Final Office Action dated Apr. 11, 2019", 18 pgs.
"U.S. Appl. No. 15/224,383, Non-Final Office Action dated Sep. 23, 2019", 13 pgs.
"Korean Application Serial No. 10-2018-7037070, Notice of Final Rejection dated Sep. 30, 2019", w/ English Translation, 5 pgs.
"Korean Application Serial No. 10-2018-7037070, Response filed Oct. 23, 2019 to Notice of Final Rejection dated Sep. 30, 2019", w/ English Claims, 16 pgs.
"U.S. Appl. No. 15/137,608, Corrected Notice of Allowability dated Oct. 2, 2019", 3 pgs.
"U.S. Appl. No. 15/224,312, Response filed Oct. 11, 2019 to Advisory Action dated Aug. 27, 2019", 17 pgs.
"U.S. Appl. No. 15/224,372, Non Final Office Action dated Oct. 16, 2019", 14 pgs.
"U.S. Appl. No. 15/224,377, Non Final Office Action dated Oct. 15, 2019", 12 pgs.
"U.S. Appl. No. 15/702,511, Notice of Allowability dated Sep. 30, 2019", 2 pgs.
"U.S. Appl. No. 15/729,582, Corrected Notice of Allowability dated Oct. 2, 2019", 3 pgs.
"U.S. Appl. No. 15/729,582, Corrected Notice of Allowability dated Oct. 30, 2019", 3 pgs.
"U.S. Appl. No. 16/219,577, Non Final Office Action dated Oct. 29, 2019", 7 pgs.
"U.S. Appl. No. 16/219,577, Response filed Oct. 3, 2019 to Restriction Requirement dated Aug. 7, 2019", 6 pgs.
"U.S. Appl. No. 16/376,598, Notice of Allowance dated Oct. 18, 2019", 5 pgs.
"U.S. Appl. No. 16/376,598, Response filed Oct. 7, 2019 to Non-Final Office Action dated Jul. 25, 2019", 2 pgs.
"U.S. Appl. No. 16/511,834, Notice of Allowance dated Oct. 23, 2019", 8 pgs.
"U.S. Appl. No. 16/511,834, Response filed Oct. 7, 2019 to Non-Final Office Action dated Aug. 20, 2019", 3 pgs.
"U.S. Appl. No. 16/662,956, Preliminary Amendment filed Oct. 24, 2019", 8 pgs.

\* cited by examiner

MESSAGE DESTINATION LIST MECHANISM

CLAIM OF PRIORITY

This application is a continuation of and claims the benefit of priority of U.S. patent application Ser. No. 15/298,806, filed on Oct. 20, 2016, which is a continuation of and claims the benefit of priority of Ser. No. 14/738,069, filed on Jun. 12, 2015, which is a continuation of and claims the benefit of priority of U.S. patent application Ser. No. 14/304,855, filed on Jun. 13, 2014, which applications are herein incorporated by reference in their entirety.

TECHNICAL FIELD

This invention relates generally to exchanging electronic messages in a computer network. More particularly, this invention relates to a geo-location based gallery of messages associated with an event.

BACKGROUND

Mobile devices, such as smartphones, are used to generate messages. The messages may be text messages, photographs (with or without augmenting text) and videos. Users can share such messages with individuals in their social network. However, there is no mechanism for sharing messages with strangers that are participating in a common event.

SUMMARY

A computer implemented method includes receiving a message and geo-location data for a device sending the message. It is determined whether the geo-location data corresponds to a geo-location fence associated with an event. The message is posted to an event gallery associated with the event when the geo-location data corresponds to the geo-location fence associated with the event. The event gallery is supplied in response to a request from a user.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION

Figure 1:
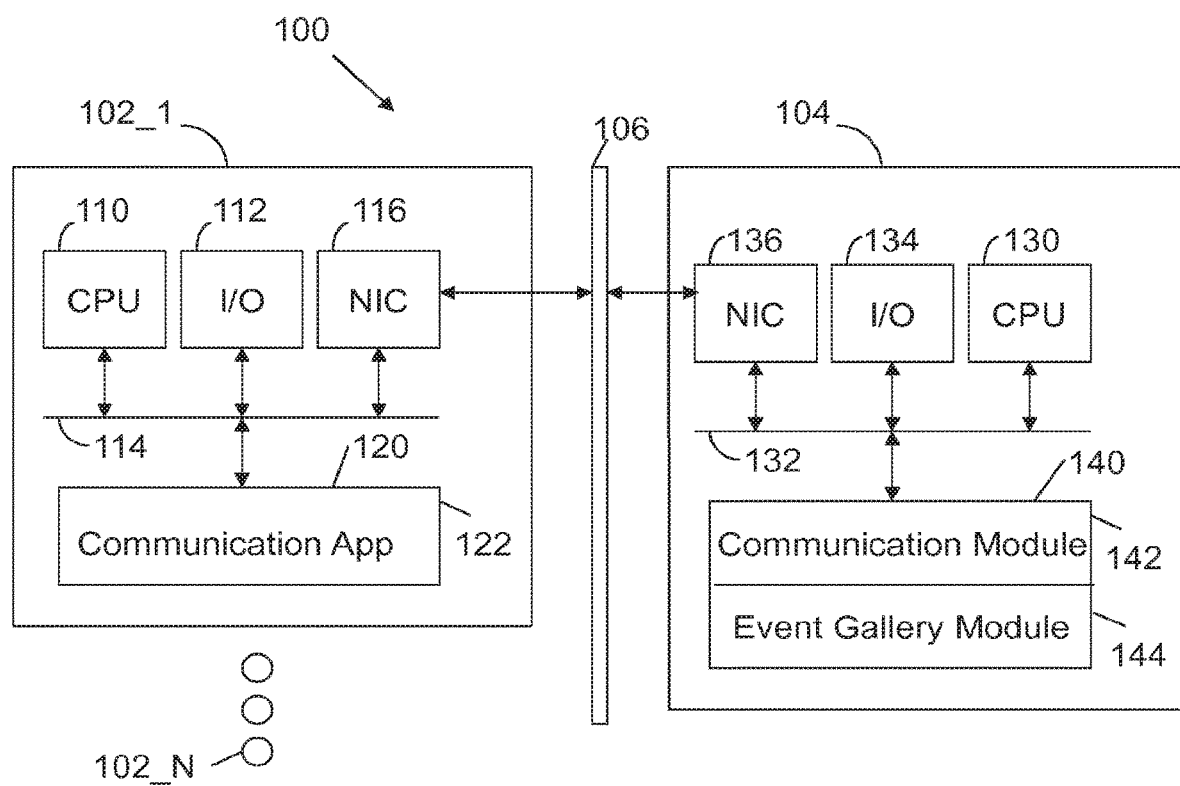
FIG. 1 illustrates a system configured in accordance with an embodiment of the invention.

Figure illustrates a system 100 configured in accordance with an embodiment of the invention. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a network 114. The input/output devices 112 may include a touch display, dedicated control buttons, physical connectors, speakers and the like. A network interface circuit 116 is also connected to the bus 114 and provides connectivity to network 106. A memory 120 is also connected to the bus 114. The memory 120 stores a communication application 122. The communication application 122 includes instructions executed by CPU 110 to coordinate communications with server 104 and/or other client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. The memory 140 stores a communication module 142. The communication module 142 includes instructions executed by the CPU 130 to coordinate communications with client devices 102. The memory 140 also stores an event gallery module 144. The event gallery module 144 includes instructions executed by the CPU 130 to store messages from participants in a live event. The messages form an event gallery, which may be supplied to a client device 102 in response to a request from a client device 102.

Figure 2:
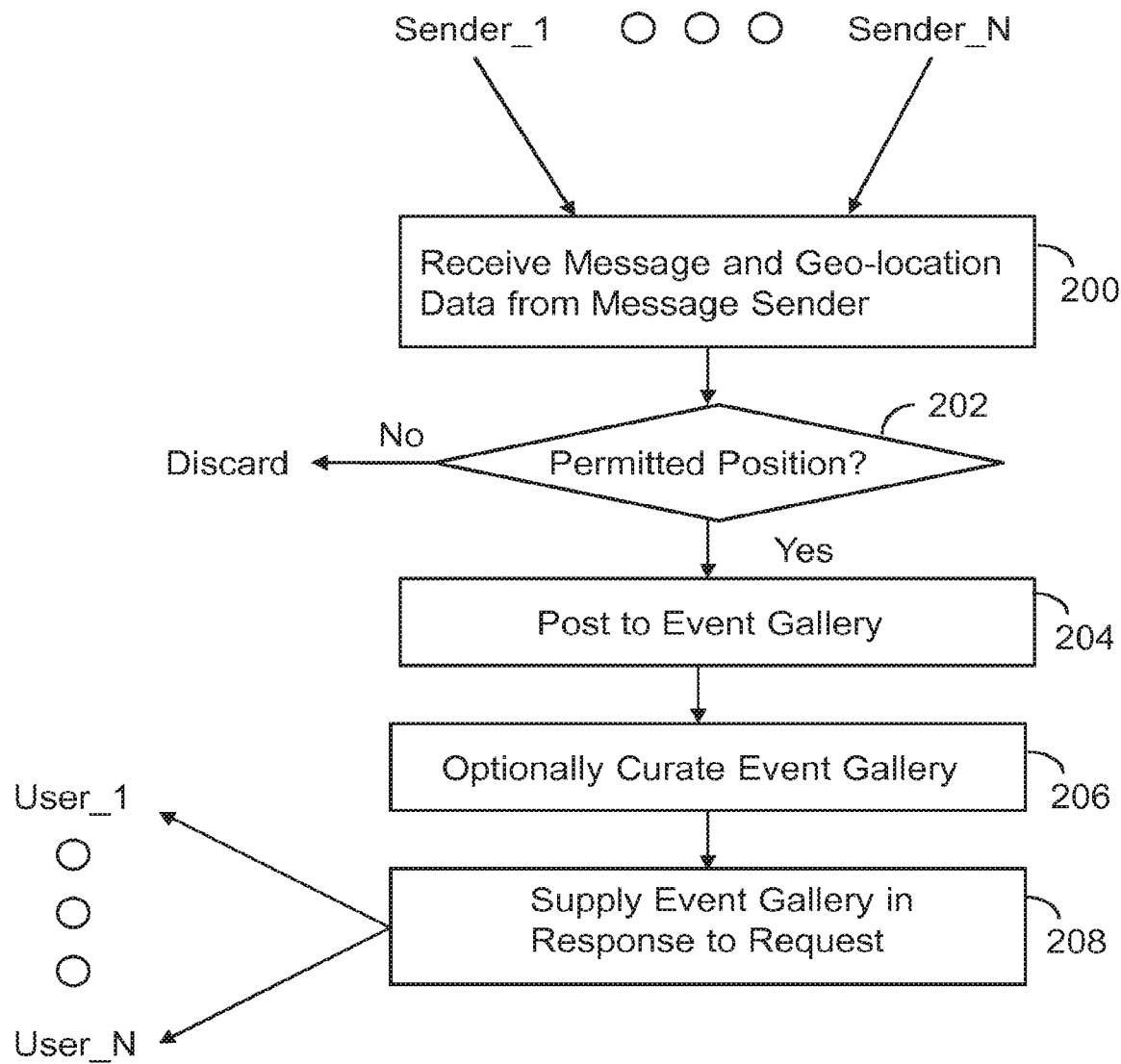
FIG. 2 illustrates server side processing associated with an embodiment of the invention.

FIG. 2 illustrates operations associated with an embodiment of the event gallery module 144. The top of the figure illustrates a set of message senders, i.e., Sender_1 through Sender_N. Each message sender is associated with a client device 102. The communication application 122 is configured to accompany a message with geo-location information. Typically, the geo-location information will be collected from a GPS chip resident in the client device. However, other geo-location information may also be used, such as cellular network geo-location information, self-reported geo-location information and the like.

The event gallery module 144 includes an administrative interface that allows one to define an event. For example, the administrative interface may prompt an event planner for event name, event description, event date, event time and event location. The event location is specified in physical coordinates (e.g., GPS coordinates) that define a geo-location fence associated with the event.

As previously indicated, messages from senders include geo-location information. The server 104 receives such messages and geo-location data 200 from any number of senders. For each message, the geo-location data is compared to the geo-location fence. If the message was not sent from within the geo-location fence it is not from a permitted position and it is therefore discarded (202-No). If the message is from a permitted position (202-Yes), the message is posted to an event gallery 204.

The event gallery module 144 may include a curation interface that allows an event planner to optionally curate the event gallery 206. For example, the curation interface may allow the event planner to delete inappropriate or redundant messages. The final operation of FIG. 2 is to supply the event gallery in response to requests 208 from any number of users.

Figure 3:
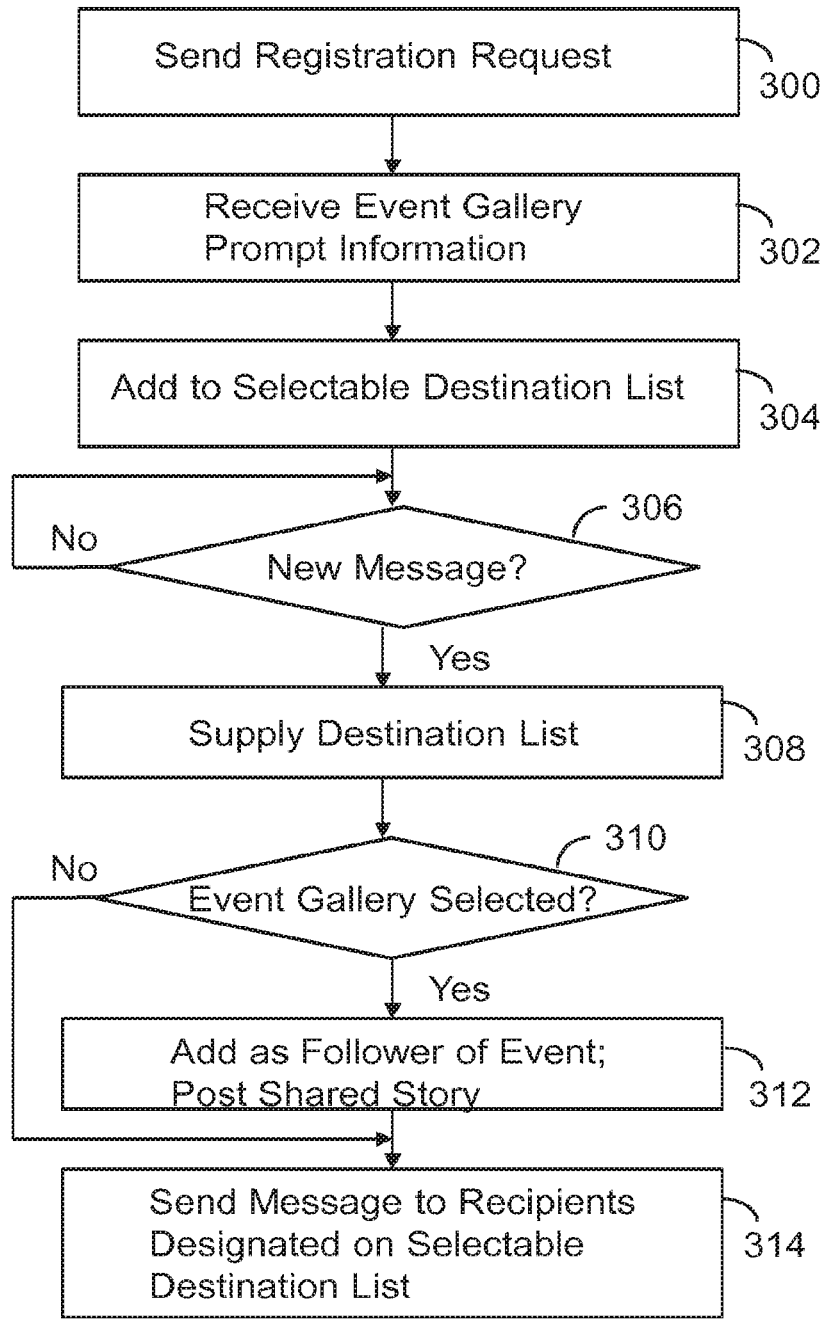
FIG. 3 illustrates client side processing associated with an embodiment of the invention.

FIG. 3 illustrates processing associated with the communication application 122 resident on a client device 102. The communication application 122 sends a registration request 300. The registration request may be an explicit request to join or follow an event. Alternately, the registration request may be triggered by sending geo-location data to server 104. The event gallery module 144 determines whether the geo-location data corresponds to a geo-location fence associated with an event. Event gallery prompt information is received 302 in response to a request. The event gallery prompt information may be indicia of the event, such as a brand, a textual description and the like. The event gallery prompt information is added to a selectable destination list 304. The selectable destination list 304 includes individuals in a user's social network. In this case, the selectable destination list is augmented with indicia of an event.

If a user generates a message (306-Yes) the destination list is supplied 308. The destination list includes individuals in a user's social network and indicia of the event and/or event gallery. If the event gallery is selected (310), the user is added as a follower of the event 312. So, for example, in the case where the user received the event gallery prompt in response to simply communicating geo-location data, the user may formally follow the event by posting a message (shared story) to the event gallery. That is, the event gallery module 144 adds the user to a list of event followers in response to the user posting a message to the event gallery. Finally, messages are sent to recipients designated on the selectable destination list 314. These recipients are typically individuals in the user's social network.

Figure 4:
FIGS. 4-8 illustrate graphical user interfaces that may be associated with embodiments of the invention.
Figure 5:
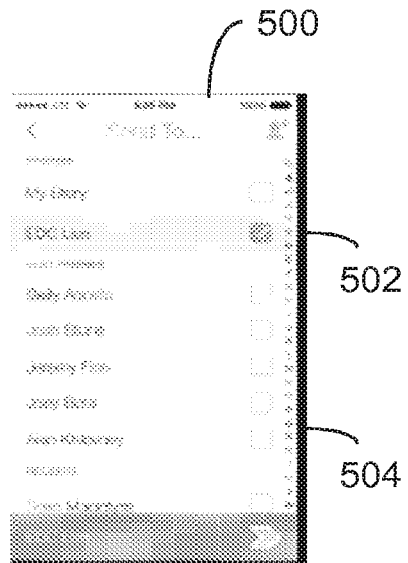
Figure 6:
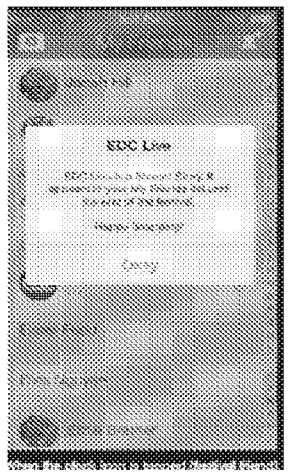
Figure 7:
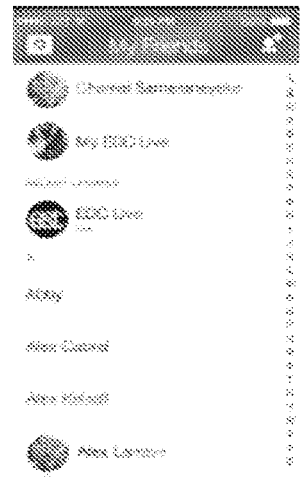

FIG. 4 is an example of a message taken at an event. In this example, the message is a photograph, which may be augmented with text. FIG. 5 illustrates a selectable destination list 500. The selectable destination list 500 includes an entry for a live event 502 and entries 504 for individuals in a social network. Selecting the live event 502 from the selectable destination list 500 may result in a prompt as shown in FIG. 6. The prompt may explain terms associated with posting content to the event gallery. FIG. 7 illustrates an interface listing friends in a social network and one or more events that are being followed.

Figure 8:

FIG. 8 is an example of an event gallery 800. The event gallery 800 includes individual posted messages 802. The messages may be photographs, videos or text messages. The event gallery may be available for a specified transitory period. For example, the specified transitory period may be the duration of an event. Indicia of the event gallery may appear in a list of friends (e.g., destination list) for the duration of the event. In one embodiment, the event gallery has individual ephemeral messages shown in a sequence. For example, a first image is shown for five seconds, then a second image is shown for three seconds, etc.

An event gallery may be open to all event participants. Alternately, an event gallery may be formed for a subset of participants selected from a destination list or some other list (e.g., a list of co-workers at an event). An embodiment of the invention maintains an ongoing event gallery (shared story) for a geo-location. For example, the shared story may extend over months. Alternately, the shared story may be renewed every twenty-four hour period at a specified geo-location.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system comprising:
   one or more computer processors; and
   one or more memories having stored thereon computer-readable instructions to configure the one or more computer processors to perform operations comprising:
   receiving a message generated via a communication application on a client device, the message comprising a photograph or video as a background for the message;
   determining that a geolocation of the client device corresponds to a geo-fence associated with a gallery, the gallery comprising a plurality of messages,
   in response to receiving the message and determining that the geolocation of the client device corresponds to the geo-fence associated with the gallery, automatically causing generation on the client device of a graphical user interface that includes a destination list comprising user-selectable destination entries, the destination entries comprising:
   a plurality of individual entries for respective individuals, each individual entry being user-selectable to cause delivery of the message to the corresponding individual; and
   a gallery entry for the gallery corresponding to the geo-fence, the gallery entry being user-selectable to cause addition of the message to the gallery, the message being accessible by other users accessing the gallery entry to view the message comprising the photograph or video as a background for the message.

2. The system of claim 1, wherein the gallery comprises a plurality of ephemeral messages, and supply of the gallery responsive to request comprises showing the plurality of ephemeral messages in sequence.

3. The system of claim 1, wherein the gallery is available for a specified transitory period only.

4. The system of claim 1, wherein the individuals corresponding to the plurality of individual entries are members of a social network of a user who generated the message.

5. The system of claim 1, wherein the operations further comprise:
   receiving a user selection of the gallery entry; and
   causing the message to be added to the gallery corresponding to the geo-fence.

6. The system of claim 1, wherein the operations further comprise:
responsive to user selection of one or more of the plurality of individual entries, sending the message to a computing device of each individual corresponding to the one or more selected individual entries.

7. The system of claim 1, wherein the operations further comprise:
responsive to user selection of the gallery entry and of one or more of the plurality of individual entries:
causing the message to be added to the gallery; and
sending the message to each individual corresponding to the one or more selected individual entries.

8. The system of claim 1, wherein the destination list includes a plurality of gallery entries for a corresponding plurality of galleries, each of which comprises a respective collection of messages.

9. The system of claim 8, wherein the plurality of gallery entries includes an event gallery associated with a geo-location fence.

10. The system of claim 1, wherein the gallery entry comprises a My Story gallery for a particular user.

11. A method comprising:
receiving a message generated via a communication application on a client device, the message comprising a photograph or video as a background for the message;
determining that a geolocation of the client device corresponds to a geo-fence associated with a gallery, the gallery comprising a plurality of messages;
in response to receiving the message and determining that the geolocation of the client device corresponds to the geo-fence associated with the gallery, automatically causing generation on the client device of a graphical user interface that includes a destination list comprising user-selectable destination entries, the destination entries comprising:
a plurality of individual entries for respective individuals, each individual entry being user-selectable to cause delivery of the message to the corresponding individual; and
a gallery entry for the gallery corresponding to the geo-fence, the gallery entry being user-selectable to cause addition of the message to the gallery, the message being accessible by other users accessing the gallery entry to view the message comprising the photograph or video as a background for the message.

12. The method of claim 11, wherein the gallery comprises a plurality of ephemeral messages, and supply of the gallery responsive to request comprises showing the plurality of ephemeral messages in sequence.

13. The method of claim 11, wherein the individuals corresponding to the plurality of individual entries are members of a social network of a user who generated the message.

14. The method of claim 11, further comprising:
receiving a user selection of the gallery entry and
causing the message to be added to the gallery corresponding to the geo-fence.

15. The method of claim 11, further comprising:
responsive to user selection of one or more of the plurality of individual entries, sending the message to a computing, device of each individual corresponding to the one or more selected individual entries.

16. The method of claim 11, further comprising:
responsive to user selection of the gallery entry and of one or more of the plurality of individual entries:
causing the message to be added to the gallery; and
sending the message to each individual corresponding to the one or more selected individual entries.

17. The method of claim 11, wherein the destination list includes a plurality of gallery entries for a corresponding plurality of galleries, each of which comprises a respective collection of messages.

18. The method of claim 17, wherein the plurality of gallery entries includes an event gallery associated with a geo-location fence.

19. The method of claim 11, wherein the gallery entry comprises a My Story gallery for a particular user.

20. A non-transitory computer-readable storage medium having stored thereon instructions for causing a machine, when executing the instructions, to perform operations comprising:
receiving a message generated via a communication application on a client device, the message comprising a photograph or video as a background for the message;
determining that a geolocation of the client device corresponds to a geo-fence associated with a gallery, the gallery comprising a plurality of messages,
in response to receiving the message and determining that the geolocation of the client device corresponds to the geo-fence associated with the gallery, automatically causing generation on the client device of a graphical user interface that includes a destination list comprising user-selectable destination entries, the destination entries comprising:
a plurality of individual entries for respective individuals, each individual entry being user-selectable to cause delivery of the message to the corresponding individual; and
a gallery entry for the gallery corresponding to the geo-fence, the gallery entry being user-selectable to cause addition of the message to the gallery, the message being accessible by other users accessing the gallery entry to view the message comprising the photograph or video as a background for the message.

* * * * *

UNITED STATES PATENT AND TRADEMARK OFFICE
CERTIFICATE OF CORRECTION

PATENT NO. : 10,524,087 B1  
APPLICATION NO. : 15/946990  
DATED : December 31, 2019  
INVENTOR(S) : Allen et al.

Page 1 of 1

It is certified that error appears in the above-identified patent and that said Letters Patent is hereby corrected as shown below:

On page 10, in Column 2, under "Other Publications", Line 27, delete "Apr. 9," and insert --Apr. 19,-- therefor On page 12, in Column 2, under "Other Publications", Line 44, delete "Resonse" and insert --Response-- therefor On page 12, in Column 2, under "Other Publications", Line 73, after "Visual", insert --Media--

On page 13, in Column 1, under "Other Publications", Line 1, delete "Epheemeral" and insert --Ephemeral-- therefor On page 13, in Column 1, under "Other Publications", Line 45, delete "15/212,094," and insert --15/212,095,-- therefor On page 13, in Column 1, under "Other Publications", Line 46, delete "Methos" and insert --Method-- therefor On page 13, in Column 1, under "Other Publications", Line 65, delete "Sep. 28, 2019"," and insert --Sep. 28, 2018",-- therefor On page 13, in Column 2, under "Other Publications", Line 3, delete "Resonse" and insert --Response-- therefor In Column 6, Lines 7-8, in Claim 15, delete "computing," and insert --computing-- therefor In Column 6, Line 35, in Claim 20, delete "messages," and insert --messages;-- therefor Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*